United States Patent
Andre et al.

(10) Patent No.: US 7,068,909 B2
(45) Date of Patent: Jun. 27, 2006

(54) FIBER COATING HAVING A LOW REFRACTIVE INDEX

(75) Inventors: Sebastien Andre, Pignan (FR); Gilles Melin, Orsay (FR); Xavier Rejeaunier, Linas (FR); Simon Lempereur, Villejuif (FR); Samuel Merlet, Lyons (FR)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/068,979

(22) Filed: Mar. 2, 2005

(65) Prior Publication Data

US 2005/0265682 A1 Dec. 1, 2005

(30) Foreign Application Priority Data

Mar. 4, 2004 (FR) ................... 04 50447

(51) Int. Cl.
*G02B 6/00* (2006.01)
(52) U.S. Cl. ............... 385/144; 385/141; 385/142; 385/143; 385/145
(58) Field of Classification Search ......... 395/141–145
See application file for complete search history.

(56) References Cited

U.S. PATENT DOCUMENTS

| | | | | |
|---|---|---|---|---|
| 4,540,597 A | * | 9/1985 | Nagasaki et al. | 427/501 |
| 4,876,298 A | * | 10/1989 | Itoh et al. | 523/433 |
| 4,884,866 A | * | 12/1989 | Hashimoto et al. | 385/145 |
| 5,302,316 A | | 4/1994 | Hasimoto et al. | |
| 5,864,641 A | * | 1/1999 | Murphy et al. | 385/12 |
| 6,204,304 B1 | * | 3/2001 | Houlihan et al. | 522/88 |

FOREIGN PATENT DOCUMENTS

EP  0 530 082 A1  3/1993

* cited by examiner

*Primary Examiner*—Frank G. Font
*Assistant Examiner*—Jerry Martin Blevins
(74) *Attorney, Agent, or Firm*—Sughrue Mion, PLLC

(57) ABSTRACT

An optical fiber includes a coating comprising a cross-linked network comprising the reaction product of monomers and oligomers and at least one polymer dispersed or interpenetrated in the cross-linked network. The oligomer and polymer components used are at least partially fluorinated. The fiber-coating composition of the invention presents a refractive index that is low while satisfying the conditions for industrial fiber-drawing.

17 Claims, No Drawings

FIBER COATING HAVING A LOW REFRACTIVE INDEX

The present invention relates to an optical fiber having a coating of low refractive index.

In general, an optical fiber comprises an optical core in which an optical signal propagates, an optical cladding, and a polymer coating which may be applied onto the optical cladding or directly onto the core, in which case it acts as optical cladding for confining the signal in the core.

The central core is generally made of pure or doped silica or of polymer, and it presents a refractive index $n_1$. The optical cladding may be made of pure or doped silica or of a plastics material, and presents a refractive index $n_2$ such that $n_2<n_1$. The polymer coating presents a refractive index $n_3$ such that $n_3<n_1$ and $n_3<n_2$. Thus, two waveguides may be constituted within the fiber: a first waveguide between the central core and the cladding; and a second waveguide between the cladding and the coating.

In certain applications, the fiber may present a multimode central core surrounded by a polymer coating which then acts as optical cladding. Such a fiber is said to be a multimode fiber.

In some applications, the optical cladding may constitute a multimode core surrounding a central core that is single-mode. The fiber is then said to be a double-core fiber and enables a multimode signal to propagate, for example a pump signal. The coating then serves to guide the pump signal in a portion of the double-core fiber. Such fibers are used for amplifier-fiber or laser-fiber applications.

In such applications, it can be important to increase the numerical aperture of the optical fiber, thus increasing its capacity for accepting a maximum amount of radiant energy.

In particular, in an application to an amplifier fiber with optical pumping associating a plurality of fiber laser diodes, the number N of such diodes and thus the total pumping power depends directly on the value of the numerical aperture of the amplifier fiber. If the laser fibers have a diameter $D_1$ and a numerical aperture $ON_1$, and if the amplifier fiber has a diameter $D_2$ and a numerical aperture $ON_2$, then optimum pump efficiency will be obtained if the relationship $(ON_2 \cdot D_2)^2 = N \cdot (ON_1 \cdot D_1)^2$ is true.

The numerical aperture of a fiber satisfies the following relationship:

$ON = \sqrt{(n_2^2 - n_3^2)}$ for a double-core fiber, with $n_2$ being the index of the multimode core, and $n_3$ the index of the coating, or $ON = \sqrt{(n_1^2 - n_3^2)}$ for a multimode fiber, with $n_1$ being the index of the multimode core, and $n_3$ the index of the coating.

It can clearly be seen from the above relationship that the numerical aperture of the fiber depends directly on the refractive index difference between the multimode core and the polymer coating.

The index of a monomode or multimode silica core can be increased by doping with phosphorous or germanium, however doping techniques are complex and the composition of the core is generally subjected to constraints that do not enable the index of the multimode core to be increased considerably. In particular, with a double-core fiber, the index of the multimode core as a whole must remain broadly less than the index of the central monomode core.

One technique then consists in reducing the refractive index of the coating in order to increase numerical aperture without changing the composition of the multimode core.

Nevertheless, the composition for making the fiber coating does not only need to present a low refractive index, it must also be compatible with fiber manufacturing constraints, and in particular with fiber-drawing. For this purpose, the coating composition must present appropriate viscosity and cross-linking rate. Furthermore, it is also desired to make use of compositions having little and suitable toxicological properties.

However, the commercially available resins that are generally used for fiber-drawing and that present adequate properties in terms of viscosity and cross-linking also present a refractive index that is too high. The composition 1D3-49 from the supplier DSM has a refractive index of 1.40 at 25° C. which leads to a numerical aperture of about 0.40. The composition Defenza 7702 A2 from the supplier Dainippon has a refractive index of 1.38 at 25° C. and leads to a numerical aperture of 0.45. Those values do not enable a pump signal to be coupled efficiently into a double-core fiber. In addition, those products present problems of instability over time and their implementation under industrial conditions is not optimal.

One technique for reducing the refractive index of materials consists in incorporating a maximum number of fluorine atoms in the molecules constituting the coating. However, the problem associated with most highly fluorinated compounds is that they are highly immiscible in most solvents and polymers. In addition, the formulations based on such fluorinated compounds generally present a viscosity that is too low for proper application onto fibers.

Thus, U.S. Pat. No. 6,249,638 describes partial cross-linking by hydrosilation of a diacrylate polyfluoropolyether in the presence of a tetrafunctional hydrogensiloxane and a platinum catalyst. The composition also contains a diacrylate, fluorine-containing monomers, and a photoinitiator. The composition then presents a viscosity in the range of 1 Pascal second (Pa·s) to 2 Pa·s, and cross-linked films from that composition present a refractive index in the range of 1.32 to 1.33 at 23° C. Nevertheless, that composition involves manufacturing method steps involving organic chemistry that is difficult to make compatible with industrial applications at a high rate of throughput. In particular, the composition retains traces of the platinum catalyst and the composition requires a pre-cross-linking step in order to obtain adequate viscosity for coating the fiber.

U.S. Pat. No. 4,884,866 describes an optical fiber, coated with a resin composition curable by irradiation of active energy rays such as electron beams or ultraviolet light, said resin composition comprising a fluorine containing polymer, a fluor-containing mono(meth)acrylate, a non-fluorine-containing mono(meth)acrylate and a polyfunctional monomer, containing at least two (meth)acryloyl groups in the molecule.

The object of the invention is to propose a fiber-coating composition of low index, making it possible to achieve an improved numerical aperture, higher than 0.45, while being compatible with fiber-drawing methods and with industrial manufacturing methods.

To this end, the invention provides an optical fiber including a coating comprising:
- a cross-linked network comprising the reaction product of
    - at least one monomer and at least one oligomer that is at least partially fluorinated; and
- at least one polymer that is at least partially fluorinated, and that is dispersed or interpenetrated in said network.

According to a characteristic, the coating comprises 40% to 90% by weight of monomer.

According to a characteristic, the coating comprises 1% to 55% by weight of oligomer.

According to a characteristic, the coating comprises 1% to 20% by weight of polymer.

According to a characteristic, the at least one monomer is selected from the group comprising: (meth)acrylates; di(meth)acrylates; tri(meth)acrylates; and mixtures thereof.

According to a characteristic, the at least one oligomer is selected from the group of polyfluoroether(meth)acrylates.

According to a characteristic, the at least one polymer is a polymer having at least one monomer selected from: difluorovinylene; hexafluoropropylene; tetrafluoroethylene; chlorotrifluoroethylene; and mixtures of two or more thereof.

According to a characteristic, the at least one oligomer presents a molecular weight in the range of 500 grams per mole (g·mol$^{-1}$) to 10,000 g·mol$^{-1}$.

According to a characteristic, the at least one polymer presents a molecular weight greater than 10,000 g·mol$^{-1}$.

According to a characteristic, the cross-linked coating presents a refractive index in the range of 1.32 to 1.38 at 25° C.

According to a characteristic, the coating prior to cross-linking presents a viscosity in the range of 1 Pa·s to 10 Pa·s.

According to a characteristic, the optical fiber presents a numerical aperture higher than or equal to 0.5.

Depending on the application, the optical fiber may have a multimode core. It may be a double core.

The invention may be applied to a laser including a portion of double-core fiber of the invention.

The invention thus relates to a fiber-coating composition comprising:

at least one cross-linkable monomer;

at least one cross-linkable oligomer that is at least partially fluorinated; and at least one polymer that is at least partially fluorinated.

According to a characteristic, the composition is adapted to constitute a coating for a fiber of the invention.

The invention also provides a method of manufacturing an optical fiber of the invention, the method being characterized in that it comprises a step of applying a composition of the invention on the drawn fiber, and a step of cross-linking said composition in order to form a coating on the fiber.

Other characteristics and advantages of the invention appear on reading the following description of embodiments of the invention given solely by way of example.

The invention provides an optical fiber including a coating comprising a cross-linked network comprising the reaction product of monomers and oligomers and at least one polymer dispersed or interpenetrated in the polymer network. The oligomer and polymer components used in the context of the present invention are at least partially fluorinated.

The fiber-coating composition of the invention presents a refractive index that is low while satisfying industrial fiber-drawing conditions, in particular presenting suitable viscosity. The fiber as obtained in this way presents a numerical aperture of about 0.53.

The fiber-coating composition of the invention comprises:

at least one cross-linkable monomer at a content of 40% to 90% by weight, and preferably 55% to 85% by weight;

at least one cross-linkable oligomer that is at least partially fluorinated, at a content in the range of 1% to 55% by weight, and preferably in the range of 5% to 30% by weight; and at least one polymer that is partially fluorinated, at a in the range of 1% to 20% by weight, and preferably in the range of 4% to 8% by weight.

If the polymer content in the composition is relatively low (e.g. less than 3%), the polymer is said to be dispersed in the cross-linked network of monomers and oligomers.

If the polymer content in the composition is relatively high (e.g. greater than 3%), the polymer is said to be interpenetrated in the cross-linked network of monomers and oligomers, since it itself constitutes a network in the cross-linked network.

The monomer(s) of the composition of the invention can be selected from the group comprising (meth)acrylates, di(meth)acrylates, and tri(meth)acrylates, and mixtures thereof. The monomer(s) used may be at least partially fluorinated.

Examples of monomers that can be used in the composition of the invention are: Forakly AC6 (3,3,4,4,5,5,6,6,7,7,8,8,8-trifluoro-octyl acrylate [17527-29-6]), AC8 (3,3,4,4,5,5,6,6,7,7,8,8,9,9,10,10,10-heptafluorodecyl acrylate [27905-45-9]), MAC6 (3,3,4,4,5,5,6,6,7,7,8,8,8-tridecafluoro-octyl methacrylate [2144-53-8]), or MAC8 (3,3,4,4,5,5,6,6,7,7,8,9,9,10,10,10,-heptafluorodecyl methacrylate [1996-88-9]), trifluoroethyl acrylate (ATRIFE) or trifluoroethyl methacrylate (MATRIFE) sold by the supplier Atofina, or more generally any (meth)acrylate containing fluorine atoms and trimethylol propane triacrylate (TMPTA) which is also a commercially-available product.

The oligomer(s) in the composition of the invention may be selected from the group of polyetheracrylates. An example is Acrylated Fomblin D which is sold by the supplier Ausimont and which is a fluorinated polyether. It is also possible in the composition of the invention to use an oligomer constituted by products taken from the Fluorolink range from the supplier Ausimont, or products from the Demmum range from the supplier Daikin.

The molecular weights of oligomers of the composition lie in the range 500 g·mol$^{-1}$ and 10,000 g·mol$^{-1}$, and are preferably about 1500 g·mol$^{-1}$.

The polymer(s) of the composition of the invention may be a terpolymer of at least one monomer selected from difluorovinylene (DFV), hexafluoropropylene (HFP), tetrafluoroethylene (TFE), chlorotrifluoroethylene (CTFE), and mixtures of two or more of them.

The polymers of the composition of the invention are preferably very long linear polymers. The molecular weight of polymers of the composition is greater than 10,000 g·mol$^{-1}$.

For example, the polymer may be Dyneon™ THV 220G sold by the supplier 3M. Dyneon™ THV may be replaced by Dyneon™ ETFE, Dyneon™ FEP, Dyneon™ HTE, Dyneon™ PFA, Dyneon™ PTFE, Dyneon™ TMF PTFE, Dyneon™ PVDF, Dyneon™ Custom PTFE, Dyneon™ Fluoroelastomer, Dyneon™ Base Resistant Elastomers, Dyneon™ Elastomer Additives, Dyneon™ PPAs, Dyneon™ Pas, Dyneon™ HFP, Dyneon™ HFPO, the Kynar range of products (Kynar PVDF, Kynarflex, . . . ) from the supplier Atofina, or the wide range of fluorinated polymers from the supplier Dupont de Nemours.

By controlling the contents of polymers and oligomers in the composition it is possible in particular to control viscosity, typically in the range of 1 Pa·s to 10 Pa·s at the application temperature, which can be compatible with industrial fiber-drawing conditions.

The composition may also include a photoinitiator such as products from the Irgacure or Darocure range from the supplier Cibadu or a thermoinitiator such as commercial peroxide type initiators, at contents in the range of 0.1% to 20%, and preferably in the range of 0.9% to 1.4% by weight of the composition.

The composition may also include an additive, such as an anti-foaming agent, an anti-oxidant, a pigment, a dye, an anti-static agent, an adhesion promoter, at concentrations in the range of 0.1% to 10% by weight.

The choice of initiator, and the amount and nature of an additive to add to the coating composition of the invention depend on the application for which the fiber is intended. The person skilled in the art knows how to determine which additives to select as a function of the intended application.

The table below represents formulations for coating compositions in accordance with the invention. Optical fibers have been drawn with coatings cross-linked from these compositions comprising Foralkyl AC6, Dyneon™ THV 220G, TMPTA, and acrylated Fomblin D, and Irgacure 2010 as a photoinitiator. The table gives the refractive indices of the coating at 25° C.

| Sample | % AC6 | % THV | % TMPTA | % FDA | % Ir2010 | Index at 25° C. |
|---|---|---|---|---|---|---|
| 1 | 83.8 | 5.5 | 4.3 | 5.1 | 1.3 | 1.3687 |
| 2 | 79.9 | 4.0 | 4.5 | 10.3 | 1.3 | 1.3665 |
| 3 | 74.5 | 4.8 | 4.0 | 15.5 | 1.1 | 1.3633 |
| 4 | 70.2 | 4.5 | 3.6 | 20.3 | 1.4 | 1.3625 |
| 5 | 70.9 | 4.6 | 3.6 | 19.5 | 1.4 | 1.3622 |
| 6 | 65.9 | 4.3 | 3.6 | 25.2 | 0.9 | 1.3607 |
| 7 | 72.5 | 6.2 | 3.7 | 16.2 | 1.3 | 1.3633 |
| 8 | 64.6 | 5.5 | 3.6 | 25.2 | 1.0 | 1.3600 |
| 9 | 60.3 | 5.2 | 3.3 | 30.0 | 1.1 | 1.3583 |
| 10 | 62.3 | 5.5 | 6.1 | 26.1 | 1.2 | 1.3662 |
| 11 | 57.9 | 6.0 | 5.1 | 30.0 | 1.1 | 1.3626 |
| 12 | 57.6 | 7.0 | 5.0 | 30.0 | 1.0 | 13622 |

Such a composition is easier and quicker to fabricate than the composition described in U.S. Pat. No. 6,249,638. In particular, there is no need to perform a pre-cross-linking step on the composition. In addition, the product used for making the coating are not of a toxic nature and they are easily accessible.

The fiber coating has been made using a conventional fiber-drawing technique. The composition of the invention has been applied on the drawn fiber and has been cross-linked in a fiber-drawing tower. Cross-linking serves to create a network comprising the at least one monomer and the at least one oligomer, with the polymer being trapped in the cross-linked network.

The fiber coating made in that way presented a thickness of 22 micrometers (μm) and had good eccentricity, of less than 2 μm. The coating did not present any yellowing or capillary instability or visible defects.

The fiber of the invention is thus particularly suitable for laser-fiber and amplifier-fiber applications. Indeed one or more pump signals can be coupled efficiently into the multimode core of a double-core fiber having such a coating.

The invention claimed is:

1. An optical fiber including a coating comprising:
   a cross-linked network comprising the reaction product of
   at least one monomer and at least one oligomer that is
   at least partially fluorinated; and
   at least one polymer that is at least partially fluorinated
   and that is dispersed or interpenetrated in said network,
   wherein the at least one oligomer is selected from the
   group of polyfluoroether (meth)acrylates.

2. An optical fiber according to claim 1, in which the coating comprises 40% to 90% by weight of monomer.

3. An optical fiber according to claim 1, in which the coating comprises 1% to 55% by weight of oligomer.

4. An optical fiber according to claim 1, in which the coating comprises 1% to 20% by weight of polymer.

5. An optical fiber according to claim 1, in which the at least one monomer is selected from the group comprising: (meth)acrylates; di(meth)acrylates; tri(meth)acrylates; and mixtures thereof.

6. An optical fiber according to claim 1, in which the at least one polymer is a polymer having at least one monomer selected from: difluorovinylene; hexafluoropropylene; tetrafluoroethylene; chlorotrifluoroethylene; and mixtures of two or more thereof.

7. An optical fiber according to claim 1, in which the at least one oligomer presents a molecular weight in the range of 500 g.mol$^{-1}$ to 10,000 g.mol$^{-1}$.

8. An optical fiber according to claim 1, in which the at least one polymer presents a molecular weight greater than 10,000 g.mol$^{-1}$.

9. An optical fiber according to claim 1, in which the cross-linked coating presents a refractive index in the range of 1.32 to 1.38 at 25° C.

10. An optical fiber according to claim 1, in which the coating prior to cross-linking presents a viscosity in the range of 1 Pa.s to 10 Pa.s.

11. An optical fiber according to claim 1, having a double core.

12. A laser including a portion of the fiber according to claim 11.

13. A method of manufacturing the optical fiber according to claim 1, comprising a step of applying a composition onto the drawn fiber, and a step of cross-linking said composition to form a coating on the fiber, wherein the composition includes at least one cross-linkable monomer, at least one cross-linkable oligomer that is at least partially fluorinated, and at least one polymer that is at least partially fluorinated.

14. An optical fiber including a coating comprising:
   a cross-linked network comprising the reaction product of
   at least one monomer and at least one oligomer that is
   at least partially fluorinated; and
   at least one polymer that is at least partially fluorinated
   and that is dispersed or interpenetrated in said network,
   wherein the optical fiber presents a numerical aperture
   greater than or equal to 0.5.

15. An optical fiber including a coating comprising:
   a cross-linked network comprising the reaction product of
   at least one monomer and at least one oligomer that is
   at least partially fluorinated;
   at least one polymer that is at least partially fluorinated
   and that is dispersed or interpenetrated in said network,
   wherein the optical fiber has a multimode core.

16. An optical fiber according to claim 15, having a double core.

17. A laser including a portion of the fiber according to claim 16.

* * * * *